United States Patent
DeGroot et al.

(10) Patent No.: US 8,002,110 B2
(45) Date of Patent: Aug. 23, 2011

(54) THERMOPLASTIC BELT CONNECTOR WITH FINGERS

(75) Inventors: Michael DeGroot, Grand Rapids, MI (US); James Honeycutt, Grandville, MI (US); Edward T. Mol, Marne, MI (US)

(73) Assignee: Thermodrive LLC, Grand Rapids, MI (US)

( * ) Notice: Subject to any disclaimer, the term of this patent is extended or adjusted under 35 U.S.C. 154(b) by 375 days.

(21) Appl. No.: 12/162,743

(22) PCT Filed: Jan. 31, 2007

(86) PCT No.: PCT/US2007/061367
§ 371 (c)(1), (2), (4) Date: Dec. 2, 2008

(87) PCT Pub. No.: WO2007/090148
PCT Pub. Date: Aug. 9, 2007

(65) Prior Publication Data
US 2009/0301845 A1  Dec. 10, 2009

Related U.S. Application Data

(60) Provisional application No. 60/743,191, filed on Jan. 31, 2006, provisional application No. 60/827,961, filed on Oct. 3, 2006.

(51) Int. Cl.
*B65G 17/00* (2006.01)
(52) U.S. Cl. .................................................. 198/844.2
(58) Field of Classification Search ............... 198/844.1, 198/844.2
See application file for complete search history.

(56) References Cited

U.S. PATENT DOCUMENTS

| 5,136,832 | A  | * | 8/1992  | Sund .............................. 56/364 |
| 5,549,193 | A  | * | 8/1996  | Schlueter et al. ........... 198/844.2 |
| 5,632,701 | A  | * | 5/1997  | Neel .............................. 474/256 |
| 5,881,863 | A  | * | 3/1999  | Borner ....................... 198/844.2 |
| 5,896,981 | A  | * | 4/1999  | Walsh et al. ............... 198/844.2 |
| 6,196,378 | B1 |   | 3/2001  | Börner |
| 6,234,304 | B1 | * | 5/2001  | DeGroot et al. ............ 198/844.2 |
| 6,234,305 | B1 | * | 5/2001  | Brown et al. .............. 198/844.2 |
| 6,328,079 | B1 |   | 12/2001 | Zils |
| 6,436,502 | B1 | * | 8/2002  | Swift et al. ....................... 428/60 |
| 6,457,392 | B2 | * | 10/2002 | Schlueter et al. .................. 83/13 |
| 6,516,943 | B2 | * | 2/2003  | Engle et al. ............... 198/844.2 |
| 6,571,939 | B2 | * | 6/2003  | Tarnawskyj et al. ....... 198/844.2 |
| 6,669,800 | B2 | * | 12/2003 | Thornton et al. ............. 156/154 |

(Continued)

FOREIGN PATENT DOCUMENTS

DE  44 42 927 A1  6/1996

(Continued)

*Primary Examiner* — Douglas Hess
(74) *Attorney, Agent, or Firm* — McGarry Bair PC (57) ABSTRACT

A toothed belt connector for making an endless belt has two leaves, adapted to be connected to each other by knuckles along one or more teeth. Each knuckle has at least one hole extending through tooth portions so that when the holes are in registry, a pin can be extended through the holes to connect the leaves at the teeth. The leaves can be adjoined to the ends of a belt to make the belt endless. The tip end of each knuckle can be beveled or it can have a stepped finger that fits into a cutout on the opposite leaf to keep the end of the knuckle from protruding as the belt wraps around a sprocket.

20 Claims, 13 Drawing Sheets

U.S. PATENT DOCUMENTS

| | | |
|---|---|---|
| 6,687,961 B2 | 2/2004 | Miller et al. |
| 7,344,020 B2 * | 3/2008 | Grywacheski et al. .... 198/844.2 |
| 7,594,574 B2 * | 9/2009 | Mol et al. ................... 198/844.2 |
| 7,703,600 B1 * | 4/2010 | Price ............................ 198/847 |

FOREIGN PATENT DOCUMENTS

| | | |
|---|---|---|
| FR | 1 065 983 A | 6/1954 |
| FR | 1 140 516 A | 7/1957 |
| WO | 2006/052629 A2 | 5/2006 |

* cited by examiner

THERMOPLASTIC BELT CONNECTOR WITH FINGERS

CROSS-REFERENCE TO RELATED APPLICATIONS

This application is a national phase of International Application No. PCT/US2007/061367, filed Jan. 31, 2007, and claims priority from U.S. Application Ser. No. 60/743,191 filed Jan. 31, 2006, and Ser. No. 60/827,961, filed Oct. 3, 2006.

BACKGROUND OF THE INVENTION

1. Field of the Invention

This invention relates to endless belts for conveyors and, more particularly, to connectors for making thermoplastic endless belts to be driven by sprockets or pulleys.

2. Description of the Related Art

Low tension, direct drive conveyor belts are typically used in situations where hygiene and cleanliness are critically important. For example, in food processing plants such as those that process meat products for human consumption, low tension, direct drive belt conveyors are used to transport items. Sanitation is critically important and, therefore, the endless belts used in such conveyors are conventionally made of materials that can be hygienically cleaned, such as thermoplastics or stainless steel.

Known belts include those formed of interlocking links having teeth that are adapted to engage drive sprockets. One of the problems with such belts is that food particles can become lodged in the joints of the interconnecting links. Consequently, cleaning the belts can be difficult and may require removing the belt from the conveyor system for special cleaning operations.

Figure 1:
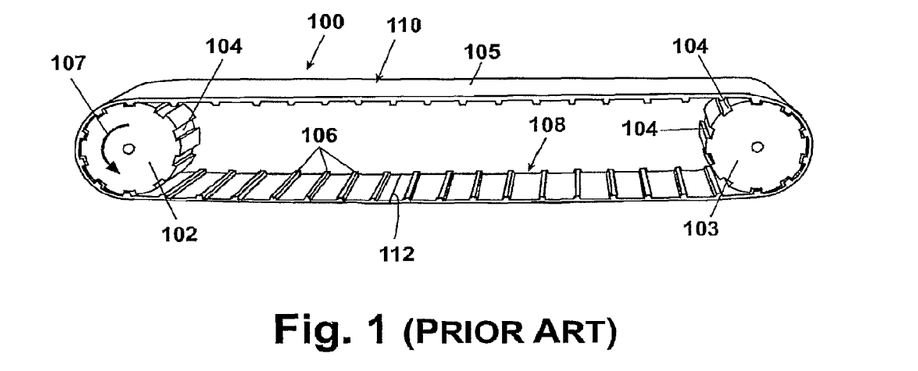
FIG. 1 is a perspective side view of a belt of the prior art installed between two sprockets.

It is also known to use flexible toothed thermoplastic belts without interlocking links where the teeth engage drive sprockets as shown in FIG. 1. An endless belt 100 in a typical installation moves around two sprockets 102 and 103. One sprocket 102 is a drive sprocket and the other 103 is typically an idler or slave sprocket. The upper span 105 of the belt will travel in the direction of arrow 107. Each sprocket 102 or 103 has a number of transverse grooves or sheaves 104 spaced around its circumference. The belt 100 has a plurality of teeth 106 equidistantly spaced from each other on the inside surface 108 of the belt. The teeth 106 engage the sheaves 104 of each sprocket.

The belt 100 has an outside surface 10 that is fairly smooth and free of discontinuities. The belt is normally formed by butt welding two ends of the belts together at a seam 112. The outside surface 110 on the upper span 105 is normally the carrying surface for transport of items. A thermoplastic belt is usually under some tension when loaded. A thermoplastic belt under tension will stretch, which may require adjustment of the tension from time to time. Also, the belt may have to be removed from the sprockets for maintenance of the system, for cleaning, or for repair. Removing the endless belt 100 of FIG. 1 is an inconvenience, normally requiring disassembly of the conveyor frame, movement of the sprockets, and possibly destruction of the belt (or at least cutting the belt to be re-seamed later).

SUMMARY OF THE INVENTION

According to the invention, a belt connector comprises two leaves, one of them having at least two knuckles and the other leaf having at least one knuckle. All knuckles have at least one hole therethrough, and each leaf has an opposed butt end to be secured to a belt so that when the leaves are connected a belt can be made endless. A pin is adapted to extend through the holes of the knuckles when the holes are in registry to connect the leaves to each other. Each knuckle has a tip end that can be beveled or it can have a stepped finger that fits into a cutout on the opposite leaf to keep the end of the knuckle from protruding as the belt wraps around a sprocket.

DESCRIPTION OF THE PREFERRED EMBODIMENT

Figure 2:
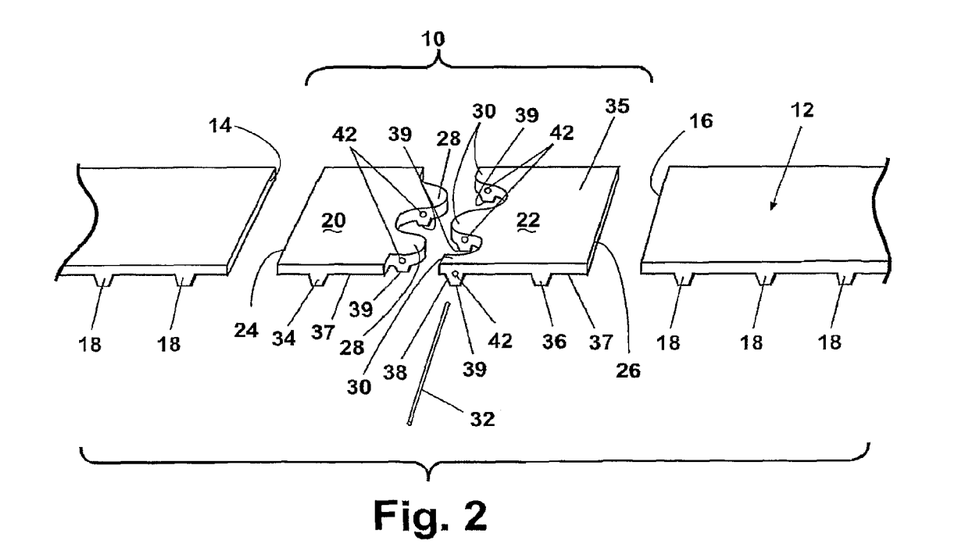
FIG. 2 is an exploded perspective view of a belt connector and belt as may be used in the installation in FIG. 1.

Looking now at FIG. 2, a belt connector 10 is shown in conjunction with a belt 12 with which it is to be used. The belt 12 is identical to that described above with respect to the prior art, except that it is not endless; the belt 12 is a belt segment that has a first end 14 and a second end 16. Each end is preferably established intermediate two teeth 18. The belt 12 can be made from any of a number of methods, e.g., milling, extrusion, and/or injection molding.

The belt connector 10 comprises two leaves 20, 22. Each leaf has a butt end 24, 26, sized to be butt welded to the respective first and second ends 14, 16 in conventional manner. Each leaf also has a plurality of knuckles 28, 30 opposite the butt ends 24, 26 that when joined by a pin 32, will form a connection. Preferably, each leaf has a tooth 34, 36, so located that when the butt ends 24, 26 are welded to the first and second ends 14, 16 on the belt, the pitch of the teeth will remain unchanged.

The knuckles 28, 30 each have tooth portions 39 that are preferably located so that when joined, they form a single tooth 38 intermediate the teeth 34, 36 on the leaves. The knuckles are joined by the pin 32 that extends through a hole 42 in each knuckle. Preferably, the pin 32 is mounted so that it can be removed at will. Thus, the belt connector 10 can be separated into separate leaves, thereby separating the belt 12 so that it can be removed from its installation with ease. Conversely, the belt 12 can be rejoined by interlacing the knuckles 28, 30 so that the holes 42 are in registry, and then inserting the pin 32 through the holes.

Figure 3:
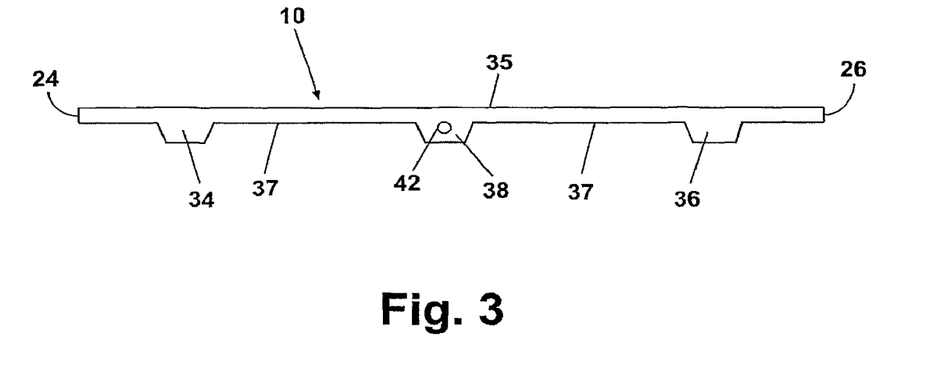
FIG. 3 is a side view of the belt connector of FIG. 2 during manufacture after a molding step.

Preferably, the belt connector 10 is of substantially the same composition as the belt 12 to which it is to be attached, normally a thermoplastic. Looking at FIG. 3, it can be seen that the belt connector 10 is preferably injection molded in one piece, with the three teeth 34, 36, 38 disposed on the same pitch as the belt to which the belt connector is to be attached. As with the belt 12, the belt connector 14 has a flat side 35 substantially free of discontinuities, and recesses 37 between the teeth 34, 36, 38 opposite the flat side. Preferably, the center tooth 38 is nominally narrower than the other two teeth 34, 36, which are preferably the same in size as the teeth 18 on the belt 12. The difference is preferably on the order of 0.0001 inches, or enough to account for tolerances between the pin 32 and the holes 42 so that the width of the tooth 38 in the connection will be about the same as the width of the other teeth 34, 36. The belt connector 10 is also molded with the hole 42 extending through the center tooth 38. It will be understood that the belt connector 10 can be molded at a standard width so that if it were to be used with a narrower belt, it can simply be cut to the appropriate width.

Figure 4:
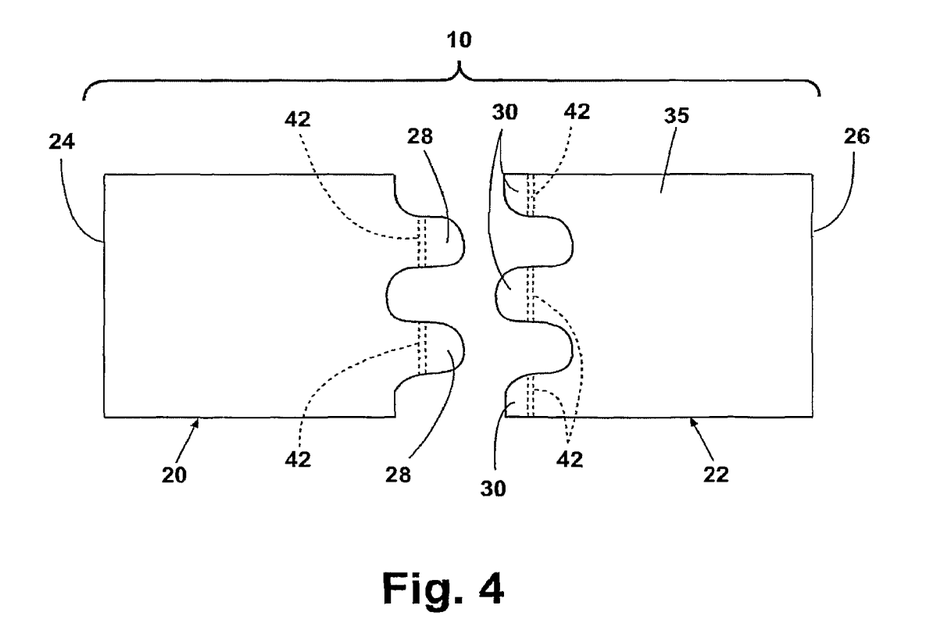
FIG. 4 is a plan view of the belt connector of FIG. 3 during manufacture after a cutting step.

Looking now at FIG. 4, it can be seen that the belt connector 10, after molding, is cut into the two leaves 20, 22. Cutting can be done by stamping, milling or any other known method of making a clean cut in thermoplastic. Preferably, the cut is a sinusoidal cut along the center tooth 38, thereby forming the individual knuckles 28, 30. The cut can take any form, such as square, saw tooth, etc. so long as there are at least two of the knuckles 28 and one of the knuckle 30 formed. Preferably there will be a plurality of knuckles 28, 30 so that a continuous hinge is formed along the tooth 38. The cut can extend into the recess 37 between the center tooth 38 and the adjacent teeth 34, 36, but preferably not too much, so that the knuckles comprise primarily the tooth 38.

Figure 5:
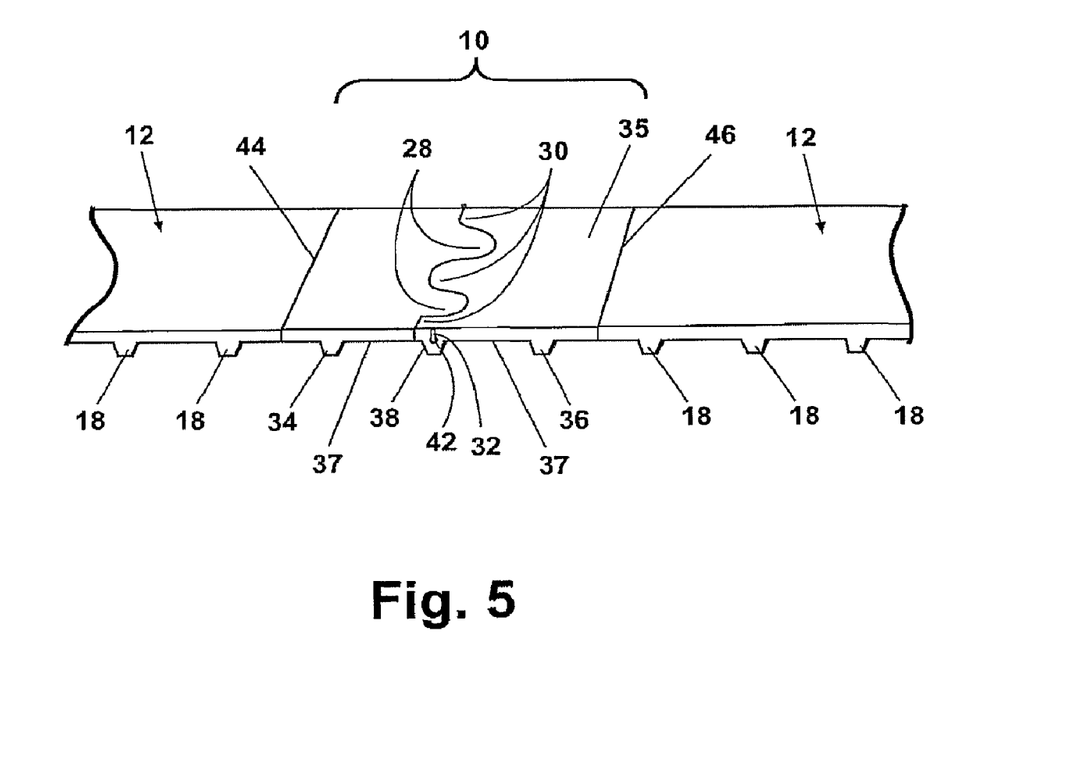
FIG. 5 is a perspective view of the belt connector and belt of FIG. 2 assembled.

To attach the belt connector 10 to a belt 12 as shown in FIG. 5, each leaf 20, 22 will be butt welded or otherwise secured by conventional means to the respective end 14, 16 to form respective seams 44, 46. The pin 32 is then inserted through the hole 42 to hingedly secure the respective knuckles 28, 30 to each other. Preferably, the pin 32 is a wire, coated or covered with a friction enhancing coating to retain the pin within the holes. Alternatively, the pin 32 can be fixed by other means such as simply bending the ends at an angle, or securing removable fasteners to the ends. To remove the belt 12 from its apparatus, one has only to remove the pin 32 from the holes 42 and separate the leaves 20, 22. The belt 12 is no longer endless and can be easily removed from its apparatus.

It will be apparent that as the belt 12 moves around a sprocket 102 or 103 as in FIG. 1, the leaves 20, 22 will tend to pivot about the pin 32. As they pivot, the knuckles 28, 30 will tend to protrude from what otherwise would be a surface 35 substantially free of discontinuities. This may create a problem if a scraper were to be used at the sprocket to scrape material off the outside surface 35 as the belt 12 moves around the sprocket. The scraper may urge waste material into the voids between the knuckles.

Figure 6:
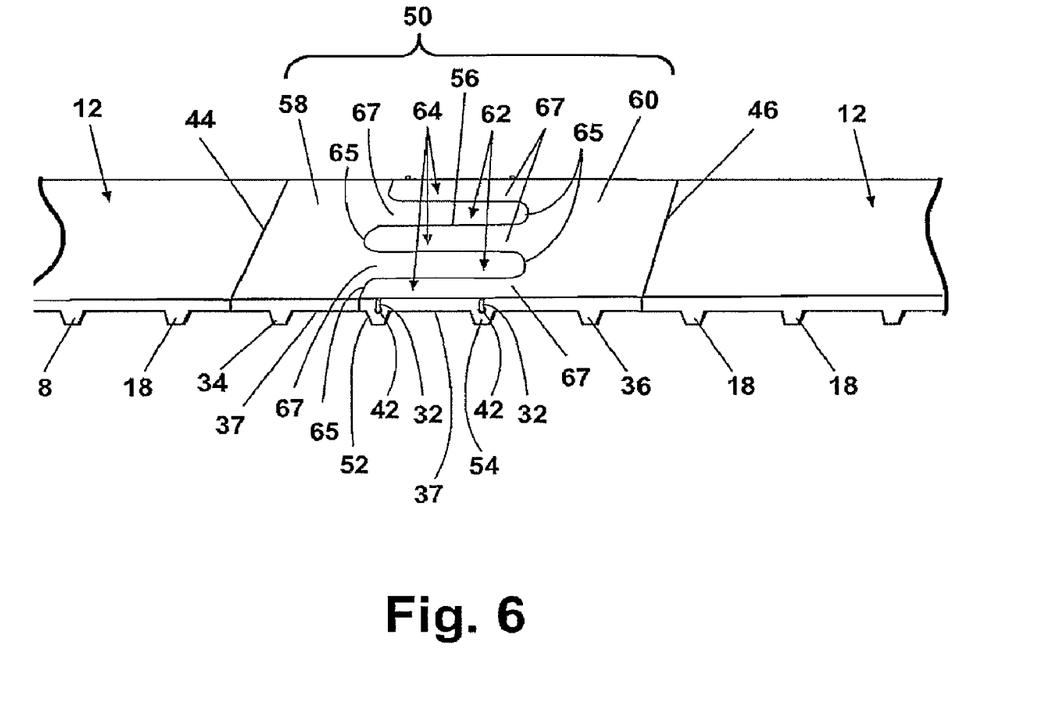
FIG. 6 is a perspective view of a second embodiment of an assembled belt connector and belt.

Turning now to FIG. 6, a second embodiment of a belt connector 50 according to the invention provides a solution to minimize the effect of the discontinuity between the knuckles. This embodiment is in most salient respects identical to the previous embodiment, except for the addition of a tooth, a second pin, and the size of the knuckles. Consequently, like components will bear like numerals with respect to the earlier embodiment.

The belt connector 50 is preferably injection molded with four teeth, two outside teeth 34, 36, and two inside teeth 52, 54, all spaced from each other the same pitch as the teeth 18 on the belt 12 to which the belt connector will be attached. Each inside tooth 52, 54 is molded with the hole 42 through it, sized to receive the pin 32. A sinusoidal cut 56 extends from one side of the tooth 52 to the other side of the tooth 54 across the recess 37 between them, forming two leaves 58, 60. Each leaf 58, 60 has respective knuckles 62, 64, and each knuckle will have a portion of two of the inner teeth 52, 54 on it. One tooth portion will be on a tip 65 of each knuckle and another tooth portion will be on a base 67 of each knuckle.

Each leaf 58, 60 is butt welded or otherwise secured by conventional means to the respective end 14, 16 to form respective seams 44, 46. A pin 32 is then inserted through the holes 42 in the respective portions of the inner teeth 52, 54 to secure the respective knuckles 62, 64 to each other. As before, each pin 32 is a wire, coated or covered with a friction enhancing coating to retain the pin within the holes. Alternatively, the pin 32 can be fixed by other means such as simply bending the ends at an angle, or securing removable fasteners to the ends. It will be apparent that with two connection points for each knuckle 62, 64, the knuckles will not rotate about either pin so as to form the kind of discontinuity that appears in the first embodiment. Rather, each knuckle 62, 64 will be urged by the tension of the belt 12 and the engagement of the teeth 52, 54 with the sprocket to bend around the sprocket, thereby minimizing the discontinuity otherwise caused by the sinusoidal cut 56. As with the earlier embodiment, the cut 56 need not be limited to a sinusoidal shape, but can take any shape so long as there are at least two knuckles on one leaf and one knuckle and the other.

Figure 7:
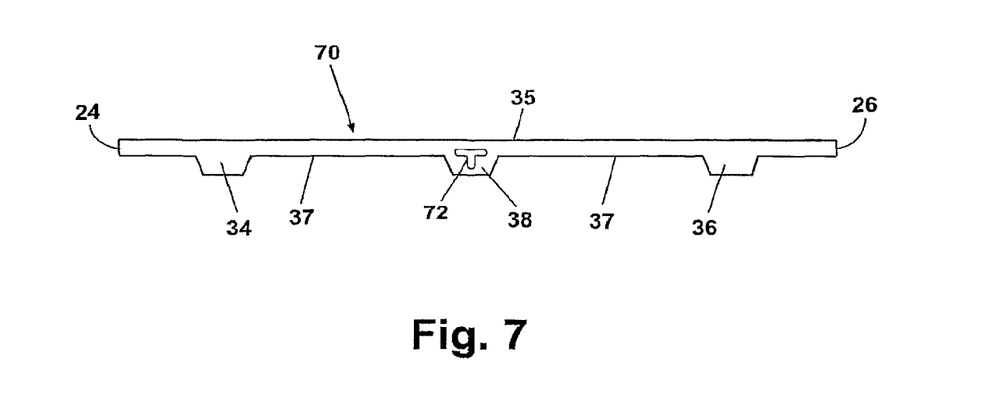
FIG. 7 is a side view of a third embodiment of belt connector during manufacture after a molding step.
Figure 8:
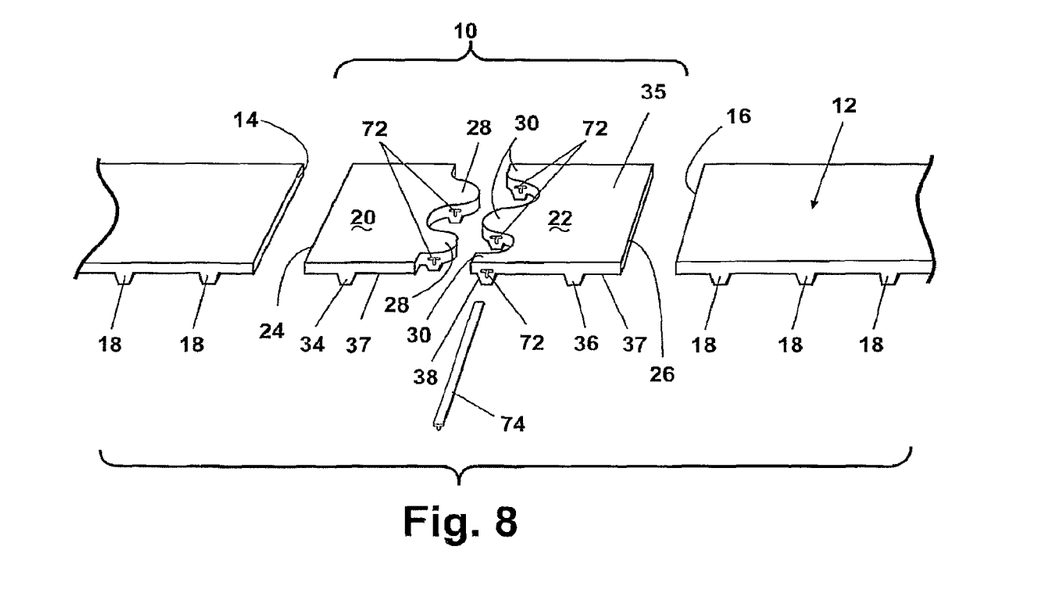
FIG. 8 is an exploded perspective view of the belt connector of FIG. 7 and a belt.
Figure 9:
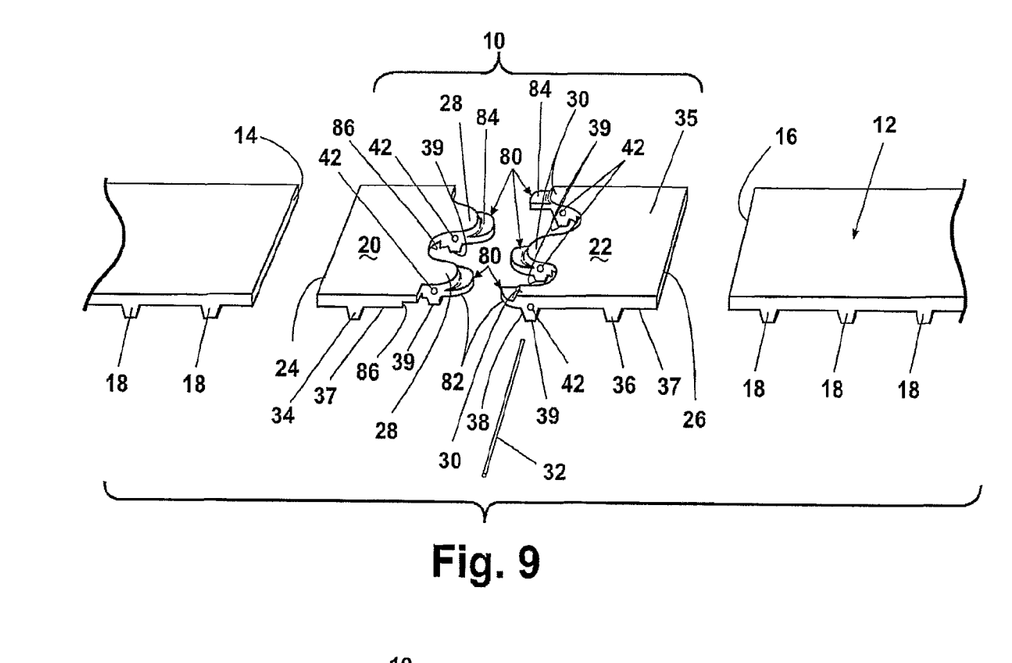
FIG. 9 is an exploded perspective view of another embodiment of a belt connector and belt.
Figure 10:
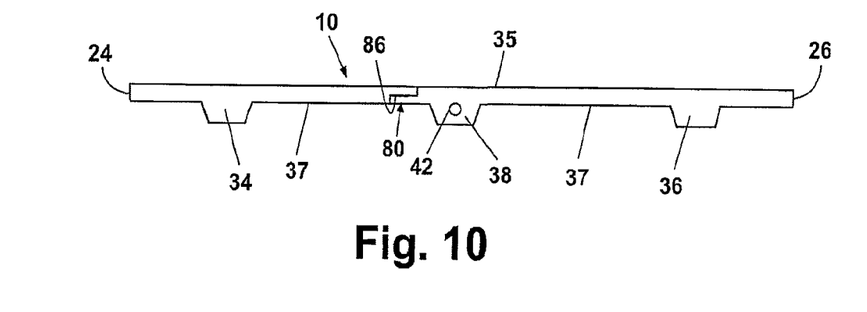
FIG. 10 is a side view of the belt connector of FIG. 9 after assembly.
Figure 11:
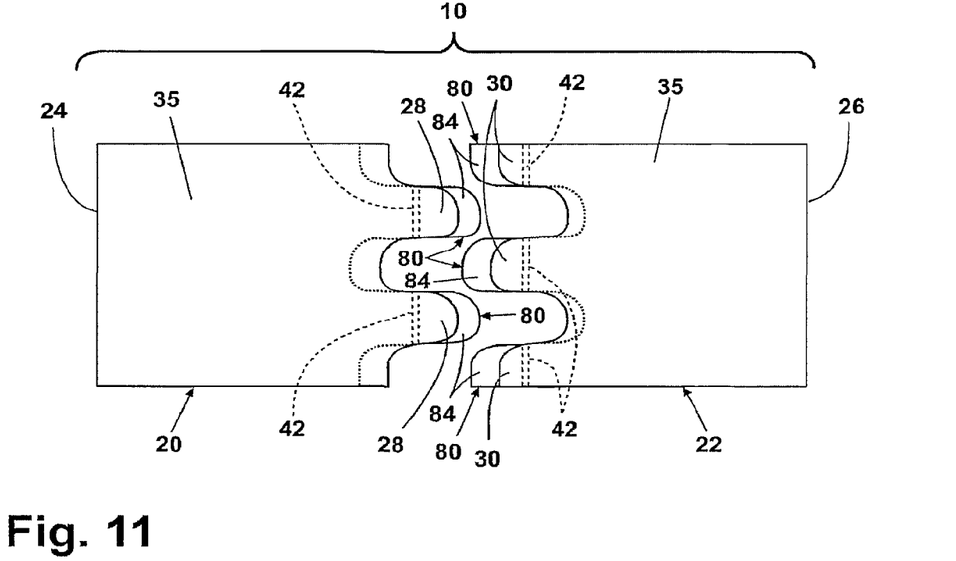
FIG. 11 is a top plan view of the belt connector of FIG. 9 before assembly.
Figure 12:
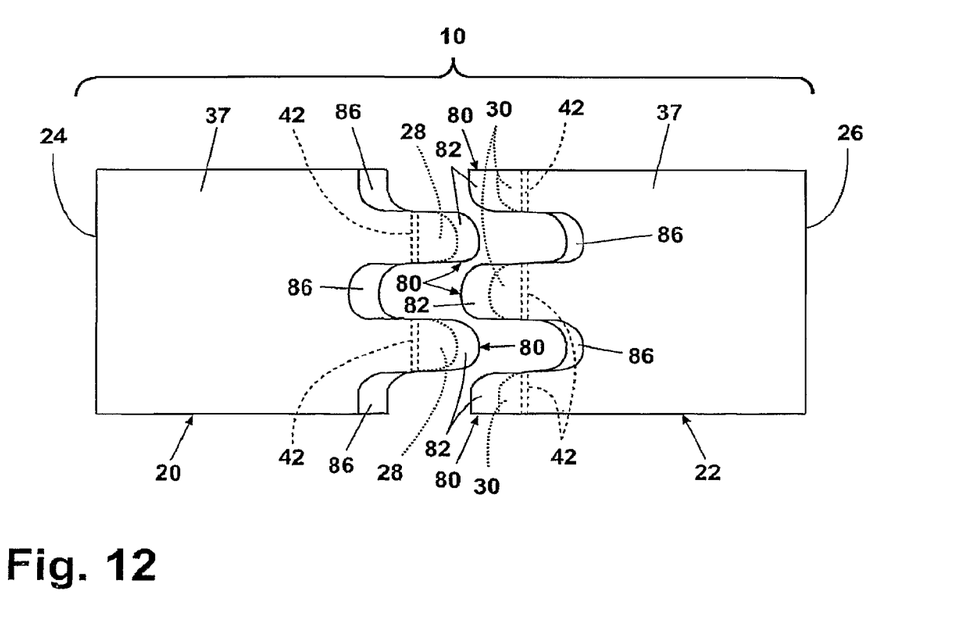
FIG. 12 is a bottom plan view of the belt connector of FIG. 9 before assembly.
Figure 13:
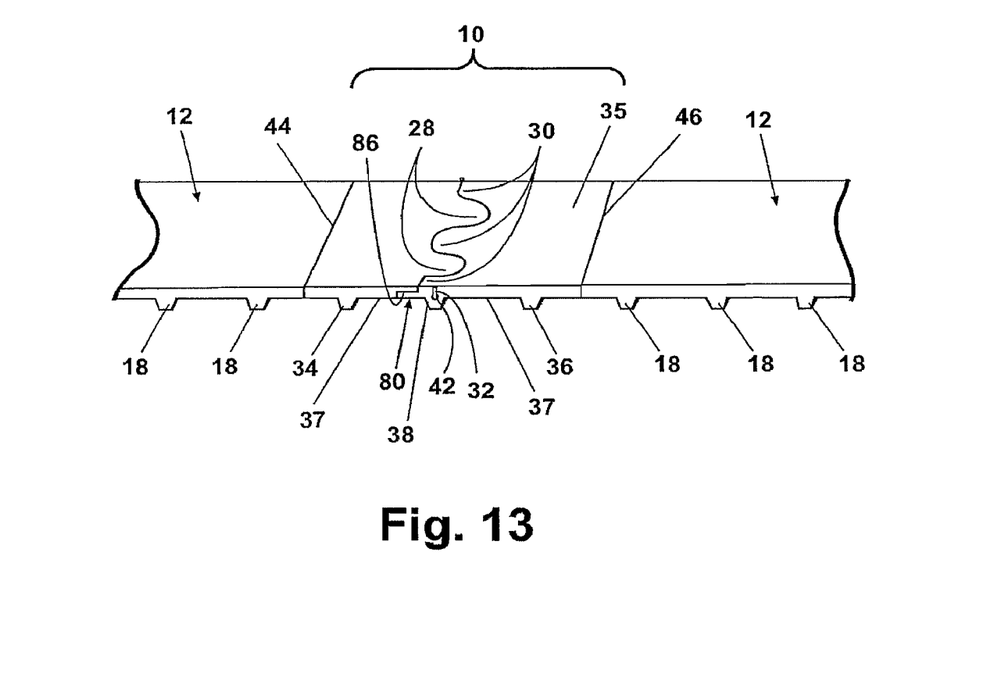
FIG. 13 is a perspective view of the belt connector and belt of FIG. 9 assembled.

FIGS. 7 and 8 disclose another solution to minimize the effect of the discontinuity between adjacent leaves. This embodiment of a belt connector 70 is in all salient respects identical to the first embodiment, except for the shape of the hole in the center to 38 and the shape of the pin. Here, the belt connector 70 is injection molded as before, with three-teeth 34, 36, and the center tooth 38. However, the center tooth 38 is molded with a shaped opening 72, shown here with a T-shaped opening. It will be understood that any shape can be used so long as the shape is noncircular or round in cross-section. A pin 74 has a cross-sectional shape identical to the shaped opening 72, and is sized to be received fairly snugly within the shaped opening. When the two leaves 20, 22 are interlaced with the shaped openings 72 in registry, the pin 74 can be received in the opening to hold the interlaced knuckles 20, 30 together. It will be apparent that the noncircular pin 74 in the noncircular opening 72 will effectively prevent the two leaves 20, 22 from rotating about the pin. Rather, they will be held to each other by the pin 74, and as they go around the sprocket they will be forced to bend around the sprocket the same way the rest of the belt 12 does. Meanwhile, the keyed pin 72 effectively minimizes the discontinuity otherwise caused by rotation of the knuckles 28, 30.

FIGS. 9-17 illustrate another solution to minimize the effect of the discontinuity between adjacent leaves. This solution is applicable to all previous embodiments. The embodiments illustrating this solution are in many salient respects identical to the previous embodiments, except for selected unique features. Consequently, like components will bear like numerals with respect to the earlier embodiments.

Looking first at FIGS. 9-13, each knuckle 28, 30 has a stepped finger 80 extending from the end of the knuckle. The stepped finger 80 is about half the thickness of the knuckle and is preferably integral with the knuckle. The stepped finger 80 is disposed so that its lower surface 82 is coplanar with the surface of the recess 37 and its upper surface 84 is stepped below the surface of the flat side 35. Preferably the junction between the upper surface 84 and the end of the knuckle is radiused. In order to accommodate the stepped fingers 80 when the knuckles 28, 30 are interlaced, cutouts 86 are provided in the recess surface 37 between adjacent knuckles and between the knuckles 28 and the edge of the leaf 20.

When a belt connector 10, 50 is secured to a belt 12, and the leaves 20, 22 secured to each other with the knuckles 28, 30 interlaced as heretofore described, each stepped finger 80 will be received in a corresponding cutout 86 so that the upper surface 35 of the belt 12 will be broken only between adjacent knuckles 28, 30, and the lower surface of the recess 37 will be broken only between the fingers 80 and the corresponding cutouts 86. It will be apparent that as the belt 12 moves around sprocket 102 or 103 as in FIG. 1, the tendency of the leaves 20, 22 to pivot about the pins 32 will be inhibited by each stepped finger 80 abutting its corresponding cutout 86. As a consequence, the end of each knuckle 28, 30 will be restrained from protruding from the surface 35, and will more effectively maintain the surface substantially free discontinuities, even as the belt 12 wraps around sprockets.

The end of each stepped finger 80 can, but need not necessarily, follow the contour of the end of its corresponding knuckle 28, 30, as illustrated in FIGS. 9-13. The stepped finger 80 can take any shape consistent with cost-effective manufacturing processes. It is preferable, however, that the contour of the cutout 86 match the contour of the stepped finger 80. One principal benefit of this embodiment is that a scraper can be used on the upper surface 35 of the belt while it wraps on the sprocket without interference from protruding knuckles.

Figure 14:
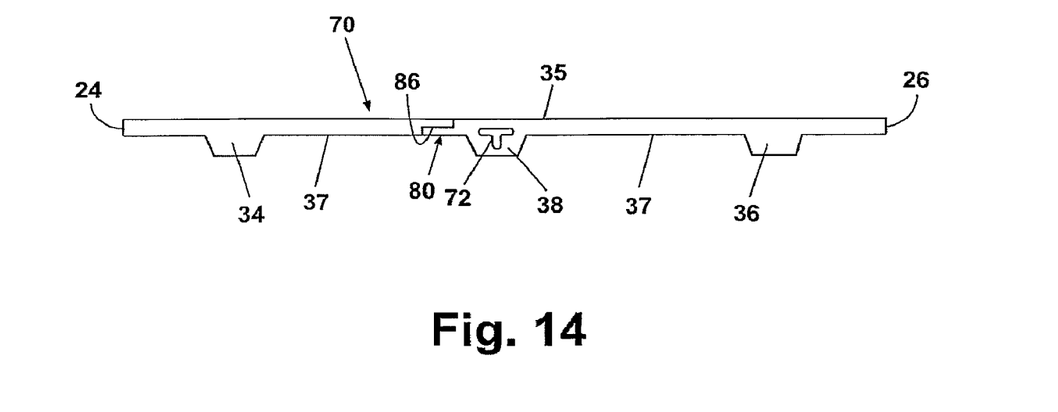
FIG. 14 is a perspective view of another embodiment of a belt connector and belt.

Minimizing the effect of a discontinuity between adjacent leaves can be enhanced by applying the foregoing invention of stepped fingers 80 and corresponding cutouts 86 to the embodiment of a belt connector with a shaped opening 72 and a shaped pin 74 has shown in FIG. 14. As explained earlier, any shape can be used so long as the shape is noncircular or round in cross-section, and the pin 74 has a cross-sectional shape identical to the shaped opening 72, sized to be received fairly snugly within the shaped opening.

Figure 15:
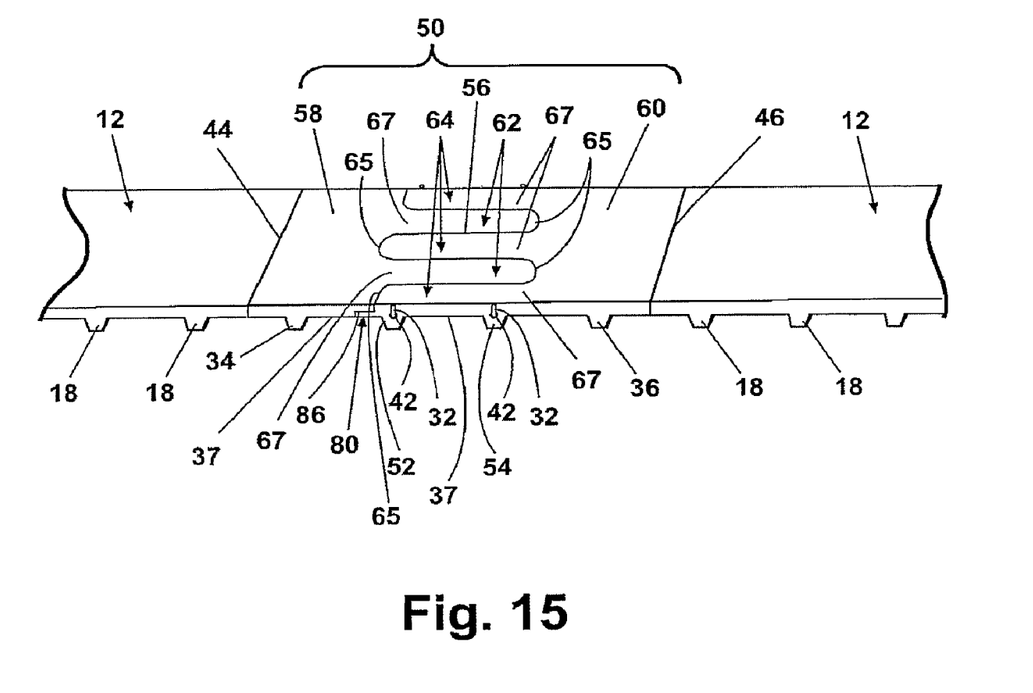
FIG. 15 is a perspective view of another embodiment of an assembled belt connector and belt.
Figure 16:
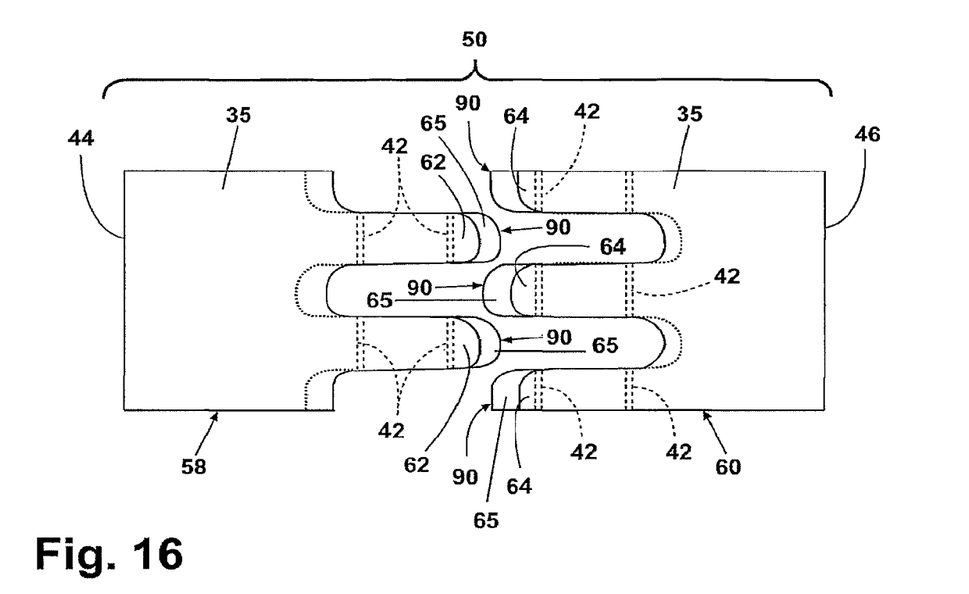
FIG. 16 is a top plan view of the belt connector of FIG. 15 before assembly.
Figure 17:
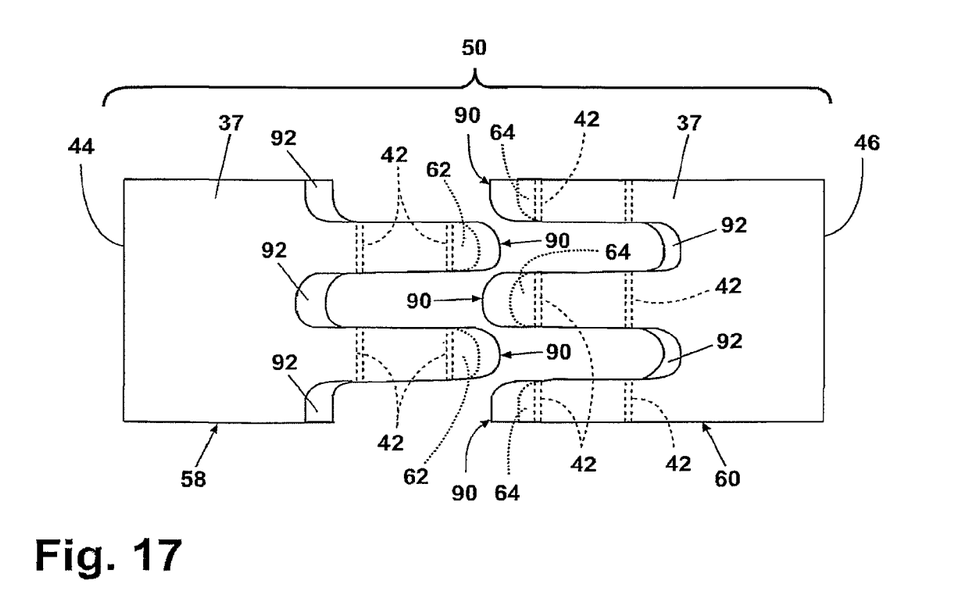
FIG. 17 is a bottom plan view of the belt connector of FIG. 15 before assembly.

FIGS. 15-17 illustrate how stepped fingers and corresponding cutouts can enhance the embodiment of elongated knuckles connected by two pins shown in FIG. 6. Here, each knuckle 64, 65 has a stepped finger 90 extending from the end thereof, and having a shape complementary to a corresponding cut out 92, in the same manner described above with respect to FIGS. 9-13. The effect is that the tip 65 of each knuckle will be restrained from protruding above the adjacent base 67 so as to maintain a substantially flat surface with minimal discontinuities as the belt 12 wraps around sprocket.

FIGS. 18-22 illustrate another solution to minimize the effect of the discontinuity between adjacent leaves. This solution is applicable to all previous embodiments. The embodiments illustrating this solution are in many salient respects identical to the previous embodiments, except for selected unique features. Consequently, like components will bear like numerals with respect to the earlier embodiments.

Figure 18:
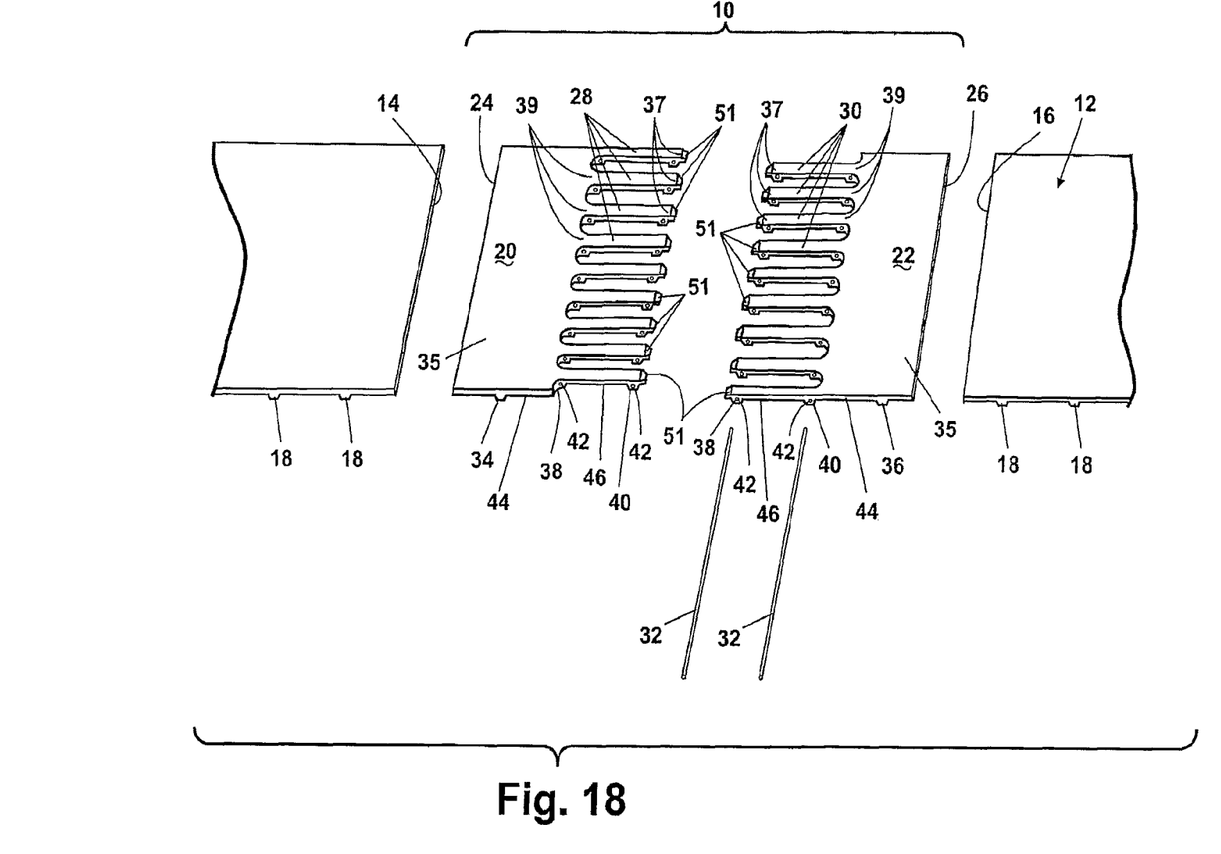
FIG. 18 is an exploded perspective view of another embodiment of a belt connector and belt according to the invention.
Figure 19:
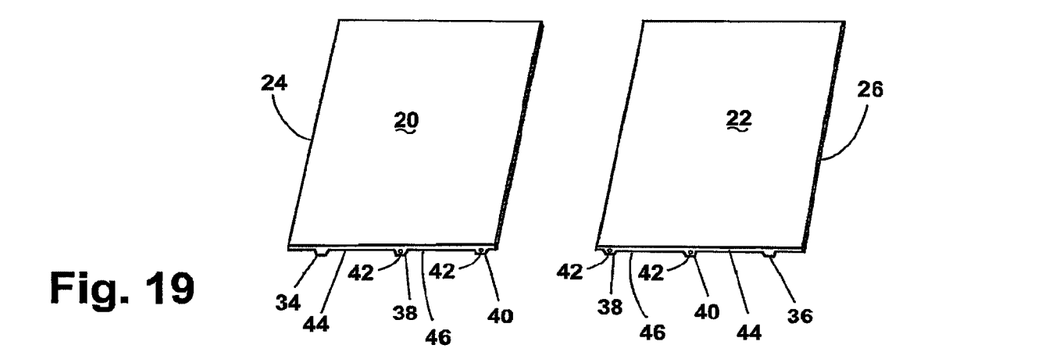
FIG. 19 is a perspective side view of the leaves of the belt connector of FIG. 18 during manufacture after a molding step.

Looking first at FIG. 18, each of the knuckles 28, 30 has a portion of the two inner teeth 38, 40 on it. One tooth portion will be on a tip 37 of each knuckle 28, 30 and another tooth portion will be one a base 39 of each knuckle 28, 30. Each inner tooth 38, 40 includes a hole 42 therethrough, which is sized to receive one of the pins 32. The knuckles 128, 130 are joined by the pins 32 that extend through the two holes 42 in each knuckle. Preferably, the pins 32 are mounted so that they can be removed at will. Thus, the belt connector 10 can be separated into separate leaves, thereby separating the belt 12 so that it can be removed from its installation with ease. Conversely, the belt 12 can be rejoined by interlacing the knuckles 28, 30 so that the holes 42 are in registry, and then inserting the pin 32 through the holes. The principal difference in this embodiment is that each tip 37 has a beveled end 51.

Preferably, the belt connector 10 is formed of thermoplastic of substantially the same composition as the belt 12 to which it is to be attached. Looking at FIG. 19, it can be seen that the preferred manufacturing process for the belt connector 10 consists of a first molding step during which the connector 10 injection molded as two leaves 20, 22. Each leaf 20, 22 is molded with an outer tooth 34, 36 and two inner teeth 38, 40 disposed on the same pitch as the belt 12 to which the belt connector 10 is to be attached. As with the belt 12, each of the leaves 20, 22 has a flat side 35 substantially free of discontinuities. An outer recess 44 is located on each leaf 20, 22 between the outer tooth 34, 36 and the nearest inner tooth 38, 40 opposite the flat side 35. An inner recess 46 is located between the two inner teeth 38, 40 opposite the flat side 35. Preferably, the outer teeth 34, 36 and inner teeth 38, 40 are the same in size as the teeth 18. It will be understood that the leaves 20, 22 can be molded at a standard width so that if it were to be used with a narrower belt, it can simply be cut to the appropriate width.

Figure 20:
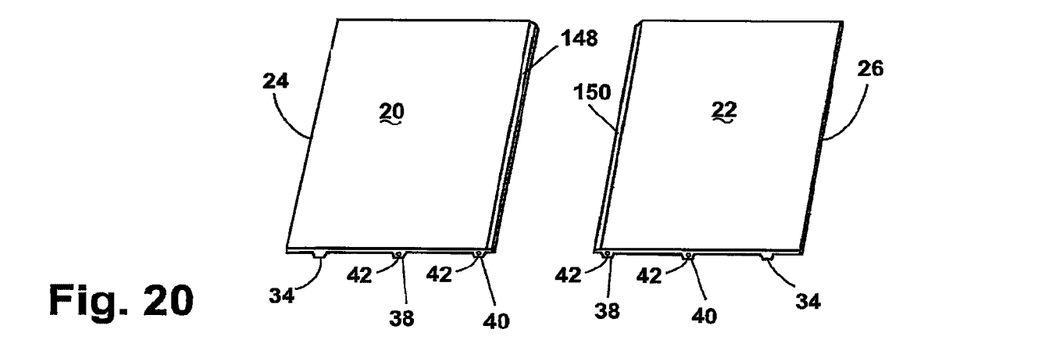
FIG. 20 is a plan perspective side view of the leaves of the belt connector of FIG. 18 during manufacture after a beveling step.

Referring now to FIG. 20, the belt connector 10 is illustrated during manufacture and after a beveling step. It can be seen that after molding, an inside edge of each leaf 20, 22 is beveled to create a beveled edge 148, 150. The edges 148, 150 are beveled in any suitable manner, such as by cutting using a heated wire. Alternatively, the beveled edges 148, 150 can be formed during the molding process. The edges 148, 150 are beveled at an angle of 20° to 30° from the plane of the flat side 35 of each leaf 20, 22. Generally, for a smaller radius of sprockets 102, 103 in use with the belt 12, a larger angle of bevel will be required. For example, a sprocket 102, 103 having a two inch radius would require a 30° angle of bevel.

Figure 21:
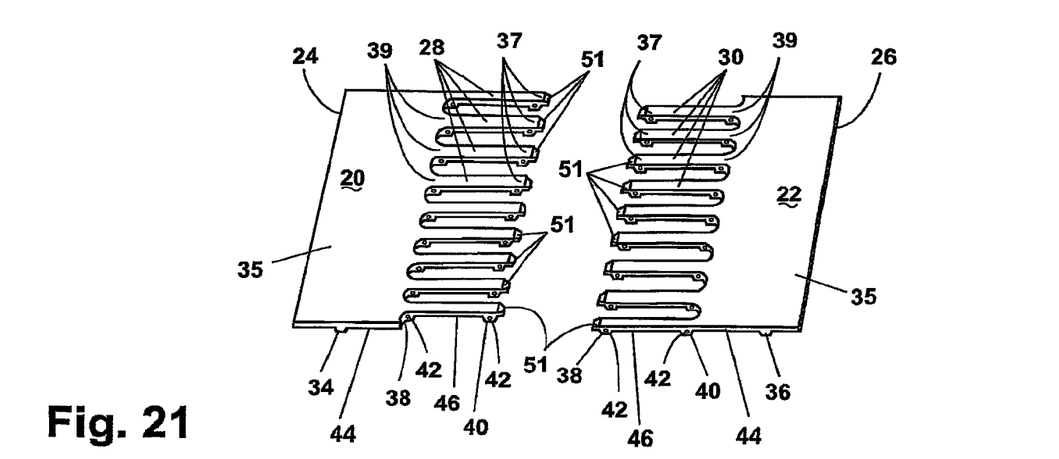
FIG. 21 is a perspective side view of the leaves of the belt connector of FIG. 18 during manufacture after a cutting step.

Looking now at FIG. 21, it can be seen that the leaves 20, 22 of the belt connector 10, after molding and beveling, are cut to form the knuckles 28, 30. Cutting can be done by stamping, milling or any other known method of making a clean cut in thermoplastic. Preferably, each cut is a sinusoidal cut along the beveled edge 148, 150 of each leaf 20, 22, thereby forming the individual knuckles 28, 30. A beveled tip portion 51 on the tip 37 of each of the knuckles 28, 30 is also created by the cut. The cut can take any form, such as square, saw tooth, etc. so long as there are at least two of the knuckles 28 and one of the knuckle 30 formed. Preferably there will be a plurality of knuckles 28, 30 so that continuous hinges are formed along the inner teeth 38, 40 when the belt connector 10 is in use. The cut can extend into the outer recess 44 but preferably not too much, so that the knuckles 28, 30 comprise primarily the inner recess 46 and the inner teeth 38, 40.

Figure 22:
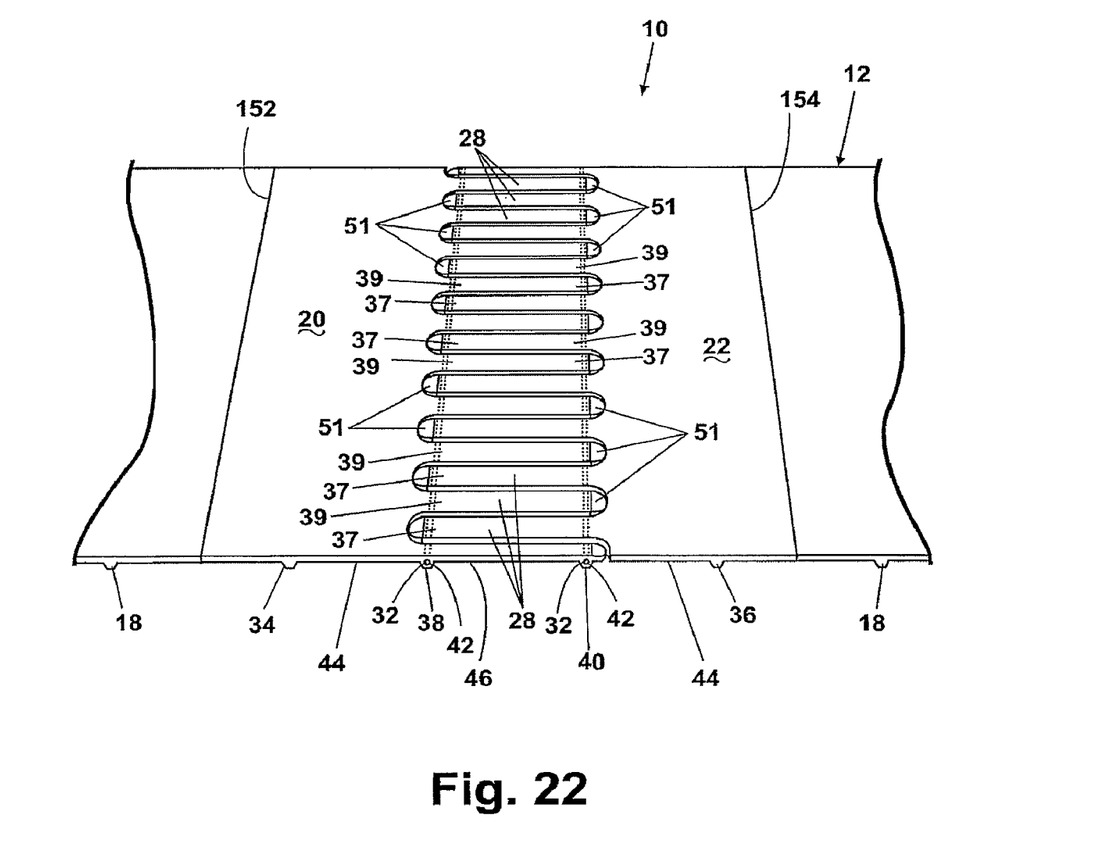
FIG. 22 is a perspective view of the belt connector and belt of FIG. 18 assembled according to the invention.

To attach the belt connector 10 to a belt 12 as shown in FIG. 22, each leaf 20, 22 will be butt welded or otherwise secured by conventional means by the butt end 24, 26 to the respective end 14, 16 to form respective seams 152, 154. The pins 32 are then inserted through the holes 42 in the respective portions of the inner teeth 38, 40 to connect the respective knuckles 28, 30 to each other. Preferably, the pins 32 are wires, coated or covered with a friction enhancing coating to retain the pins within the holes. Alternatively, the pins 32 can be fixed by other means such as simply bending the ends at an angle, or securing removable fasteners to the ends. To remove the belt 12 from its apparatus, one has only to remove the pins 32 from the holes 42 and separate the leaves 20, 22. The belt 12 is no longer endless and can be easily removed from its apparatus.

As the belt 12 moves around a sprocket 102 or 103 as in FIG. 1, it will be apparent that with two connection points for each knuckle 28, 30, the knuckles will be urged to rotate less about either pin 32 so as to minimize discontinuities in the belt 12. In other words, each knuckle 28, 30 will be urged by the tension of the belt 12 and the engagement of the teeth 34, 36, 38, 40 with the sprockets 102, 103 to bend around the sprockets, thereby minimizing the discontinuities otherwise caused by the cut. Moreover, as the knuckles are urged around the sprockets, the beveled tip portions 51 of the tips 37 of the knuckles 28, 30 will tend to align with the flat side 35 of the opposite leaf 20, 22 so as remove any obstructing discontinuity that may remain. The beveled tip ends 51 tend to maintain a smooth transition from the flat side 35 of one leaf to the flat outer surface of the adjacent knuckle with minimal discontinuities. A scraper can thus easily and effectively be used at the sprocket 102 or 103 to scrape material off the belt 12 as it moves around the sprocket.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims. For example, while the belt connector is shown herein as separate from the remainder of the belt, it is within the scope of the invention for the belt connector to be integral with the belt. Thus, the belt can be formed as a single piece have two ends and the belt connector can be formed from the two ends, so that it does not have to be separately attached by welding, etc. Similarly, the belt need not be limited to thermoplastic; it can be made of any suitable material, and it can also be reinforced with multiple materials.

We claim:

1. A belt connector for connecting two ends of a belt segment to make an endless belt, wherein the belt connector comprises two leaves, each leaf having a flat side, one of the leaves having at least two knuckles and the other leaf having at least one knuckle, all knuckles having a tip end and a hole extending through the knuckle, each leaf having an end opposite the tip ends that is adapted to be secured to a belt segment, and a pin adapted to extend through the holes of the knuckles when the holes are in registry to connect the leaves to each other, characterized by the tip end of each knuckle having an inside edge that is beveled from the plane of the flat side whereby when the belt connecter is installed on a belt segment with the leaves connected to each other and when the knuckles are urged around a sprocket, the beveled tip edges will tend to align with the flat side of the opposite leaf to minimize an obstructing discontinuity at the tip end of the knuckles.

2. A belt connector according to claim 1 wherein at least one leaf has a tooth or a tooth portion on one side thereof.

3. A belt connector according to claim 1 wherein a tooth is formed of tooth portions on the knuckles of the leaves.

4. A belt connector according to claim 1 wherein the hole in each knuckle extends through the tooth portion so that when the pin extends through the holes, it will extend through the tooth.

5. A belt connector according to claim 1 wherein each leaf has a tooth or a tooth portion on one side thereof.

6. A belt connector according to claim 1 wherein the tooth is formed of tooth portions on the knuckles of the leaves.

7. A belt connector according to claim 1 wherein the hole in each knuckle extends through the tooth portion so that when the pin extends through the holes, it will extend through the tooth portion, said tooth portions on the knuckles being aligned to form a single tooth on the belt.

8. A belt connector according to claim 1 wherein the holes and the pin are keyed so that the pin cannot rotate relative to the holes.

9. A belt connector according to claim 1 wherein the knuckles are elongated and all knuckles have two holes therethrough, spaced from each other, one toward the tip of the knuckle and the other toward the base of the knuckle and disposed so as to align in registry when the knuckles are interpositioned with each other.

10. A belt connector according to claim 1 wherein the belt connector is formed of thermoplastic.

11. An endless belt having two ends connected by a belt connector according to claim 1.

12. A belt connector for connecting two ends of a belt segment to make an endless belt, wherein the belt connector comprises two leaves, each leaf having a flat side, one of the leaves having at least two knuckles and the other leaf having at least one knuckle, all knuckles having a tip end and hole extending through the knuckle, each leaf having a butt end opposite the tip ends and adapted to be secured to a belt segment, and a pin adapted to extend through the holes of the knuckles when the holes are in registry to connect the leaves to each other, characterized by each tip end having a stepped finger extending therefrom with its upper surface stepped below the surface of the flat side, and each leaf having a cutout adjacent to the knuckles to receive the stepped finger with the upper surface of the belt broken only between adjacent knuckles and the lower surface of the belt broken only between the finger and the corresponding cutouts, whereby the tendency of the leaves to pivot about the pin is inhibited by each stepped finger abutting its corresponding cutout.

13. A belt connector according to claim 12 wherein two teeth are formed of tooth portions on the knuckles of the leaves.

14. A belt connector according to claim 12 wherein the holes in each knuckle extend through the tooth portions so that when the pin extends through the holes, it will extend through the teeth.

15. A belt connector according to claim 12 wherein the holes and the pin are keyed so that the pin cannot rotate relative to the holes.

16. An endless belt having two ends connected by a belt connector according to claim 12.

17. A method of making a belt connector comprising the steps of:
  providing two leaves, each leaf being flat on one side and having three teeth on the other side, each of two teeth having a hole extending therethrough;
  beveling an edge of each leaf from the flat side to form beveled edges; and
  cutting each leaf to form at least two knuckles in one leaf and one knuckle in the other leaf, each knuckle having a toothwith a hole through it and a beveled edge.

18. The method of claim 17 wherein the two leaves are formed by molding.

19. The method of claim 18 wherein the beveling step occurs simultaneously with the molding step.

20. The method of claim 17 wherein the leaves are formed of thermoplastic.

* * * * *